United States Patent
Sun

(10) Patent No.: US 6,219,410 B1
(45) Date of Patent: Apr. 17, 2001

(54) METHOD OF AND APPARATUS FOR HIDING NUMBERS INPUTTED BY A USER FROM BEING DISPLAYED ON THE LCD SCREEN OF A DIGITAL TELEPHONE

(75) Inventor: You-Jeong Sun, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/366,330

(22) Filed: Aug. 2, 1999

(30) Foreign Application Priority Data

Jul. 31, 1999 (KR) .................................. 98 31227

(51) Int. Cl.⁷ ....................................... H04M 1/00
(52) U.S. Cl. .................... 379/156; 379/157; 379/352; 379/399; 379/354; 455/410
(58) Field of Search ...................... 379/156, 157, 379/161, 164, 188, 189, 199, 200, 352, 354, 399, 93.7, 93.23, 142; 455/410, 411, 566

(56) References Cited

U.S. PATENT DOCUMENTS

| | | | |
|---|---|---|---|
| 4,709,387 | * 11/1987 | Masuda | 379/354 |
| 4,720,855 | * 1/1988 | Ohnishi et al. | 379/354 |
| 5,016,276 | 5/1991 | Matumoto et al. | 389/45 |
| 5,349,629 | * 9/1994 | Kumano | 455/410 |
| 5,463,679 | 10/1995 | Kai et al. | 379/145 |
| 5,583,921 | 12/1996 | Hidaka | 379/93 |
| 5,642,365 | 6/1997 | Murakami et al. | 371/38.1 |
| 5,727,050 | 3/1998 | Mori et al. | 379/100.09 |

* cited by examiner

Primary Examiner—Stella Woo
Assistant Examiner—Binh K. Tieu
(74) Attorney, Agent, or Firm—Robert E. Bushnell, Esq.

(57) ABSTRACT

A method of displaying the numbers inputted by a user on a liquid crystal display (LCD) screen provided in a telephone connected through an extension with a telephone switching system, comprises the steps of setting the telephone to the hide key mode to hide the numbers in response to the input of a hide key, and hiding the numbers by replacing the numbers with obscuring symbols displayed on the liquid crystal display (LCD) screen.

20 Claims, 3 Drawing Sheets

METHOD OF AND APPARATUS FOR HIDING NUMBERS INPUTTED BY A USER FROM BEING DISPLAYED ON THE LCD SCREEN OF A DIGITAL TELEPHONE

CLAIM OF PRIORITY

This application makes reference to, incorporates the same herein, and claims all benefits accruing under 35 U.S.C. §119 from my application METHOD FOR PROCESSING AN INPUT NUMBER BY USER AND DISPLAYING THE NUMBER ON THE LCD OF TELEPHONE filed with the Korean Industrial Property Office on Jul. 31, 1998 and there duly assigned Serial No. 31227/1998.

BACKGROUND OF THE INVENTION

1. Field of the Invention

The present invention relates to a method of and apparatus for hiding the numbers inputted by a user from being displayed on the liquid crystal display (LCD) provided in a digital or key telephone.

2. Description of the Related Art

Nowadays, there are many cases where the telephone communication is established through private automatic branch exchange (PABX) or key telephone system. Although the ordinary telephone is only provided with the dialing keys for inputting phone numbers 1–9 and 0, and the function keys * and #, the digital or key telephone recently developed especially for use in the private automatic branch exchange (PABX) or key telephone system includes a liquid crystal display (LCD) and light emitting diode (LED) together with additional function keys in order to provide the user with more convenience. An example of such digital telephone is the telephone Model No. SDP380L provided by Korean Samsung Electronics Co.

When using such digital telephone provided with a liquid crystal display (LCD), the numbers or information inputted by the user are displayed on the liquid crystal display (LCD) screen. Such numbers or information can include the phone number, a number or identifying information for the automatic response system, a number or identifying information of the pager, a number or identifying information for the voice mailing system, a number or identifying information for the phone banking system, etc. In this case, there can occur many cases where the number or identifying information inputted is required to be kept secret as in phone banking.

U.S. Pat. No. 5,016,276 to Matumoto, et al. entitled *Common Cyptokey Generation System And Communication System Using Common Cyptokeys,* disclose a system for generating a cryptokey to be shared among entities engaged in communications, in particular one known as the key predistribution system. It is disclosed identifiers for the entities engaging in communications under a center and a center algorithm which only the center knows are generated, then secret algorithms distinct to each entity are generated on added to IC cards or other cipher generation means. It is disclosed a cipher generation means is provided for each entity. It is disclosed the identifiers of the other entity are applied to computer a cryptokey, whereby a common cryptokey is generated. Also disclosed is a system for communications using the above shared cryptokey.

U.S. Pat. No. 5,463,679 to Kai, et al. entitled *Public Telephone System,* disclose a public telephone system that includes public telephone sets assigned with different specific numbers and allowing speech communication using cards and a center apparatus connected to the public telephone sets through a telephone line. It is disclosed the center apparatus includes a list number forming unit for forming one list number from numbers of a plurality of invalid cards produced by illegally rewriting the cards, a registering unit for registering each formed list number in association with a series number, management number, and telephone number of each of the telephone sets, a storage unit for storing the list number and the series number, management number, and telephone number of each telephone set, all of which are registered by the registering unit, and a list number transmitting unit for calling, through the telephone line, each public telephone set corresponding to the telephone number registered in the storage unit and transmitting a list number corresponding to each telephone set. It is disclosed each public telephone set includes a controller for controlling on the basis of the list number whether speech communication is allowed in use of a card.

U.S. Pat. No. 5,583,921 to Hidaka entitled *Data Transmitting/ReceivingApparatus And Data Communication System,* discloses when receiving a conversion instruction from a key input section, a CPU reads character data stored in a message memory to a conversion buffer, converts the same into numeric data base on a conversion table, causes a tone signal generator to convert the same into a DTMF signal and outputs the signal to a speaker. It is disclosed when an input instruction of a registration designation and message number is received from the key input section, the CPU forms transmission data for sequentially storing the input information and the numeric data converted from character data in this order, causes to convert the same into the DTMF signal and outputs the signals. It is disclosed at the time of reception of the transmission data, the CPU identifies the content of the data, restores the numeric data into the character data based on an inverse conversion table, retrieves a message number from a TEL bank memory and registers a message into a memory area assigned to the number.

U.S. Pat. No. 5,642,365 to Murakami, et al. entitled *Transmitter For Encoding Error Correction Codes And A Receiver For Decoding Error Correction Codes On A Transmission Frame,* disclose error correcting coding for random errors and cell loss and a transmitter for coding error correction codes and a receiver for decoding error correction codes on a transmission frame which minimizes transmission delay. It is disclosed a buffer memory divides data symbols of a data transmission cell into blocks and stores the data blocks for each of cells to form a transmission frame. It is disclosed a check code generator carries out the error correcting coding in the unit of blocks in a direction orthogonal to the direction of transmission. It is disclosed a cell composer selects a specific cell of blocks having data symbols and generates a transmission cell. A counter appends an identifier to the top of cells in the transmission direction. It is disclosed the cell with the identifier is transmitted after being replaced with a part of the coding cells as requested.

U.S. Pat. No. 5,727,050 to Mori, et al. entitled *Communication Device Having A Facsimile Module For Carrying Out Confidential Communication,* disclose a communication device having a facsimile module for carrying out confidential communication regardless of the type of communication device of a caller. It is disclosed a called station number (telephone or facsimile number) detector to which a telephone set on a called side is connected is an integrated unit of the facsimile module. A CPU common to the called station number detector and the facsimile module is provided in the facsimile module. It is disclosed the CPU is connected to ROM, RAM, image memory and the like and determines from the called station number and password entered by the caller whether use of a mail box in the image memory should be permitted or not. It is disclosed if the use of the mail box is permitted, the CPU allows communication between the caller terminal and the mail box. Otherwise, normal facsimile communication is carried out.

SUMMARY OF THE INVENTION

It is an object of the present invention to provide a method of hiding the number inputted from being displayed on the liquid crystal display (LCD) screen of a telephone.

According to an aspect of the present invention, a method of displaying the numbers or identifying information inputted by a user on a liquid crystal display (LCD) screen provided in a telephone connected through an extension with a telephone switching system, includes the steps of setting the telephone to the hide key mode to hide the numbers or identifying information in response to the input of a hide key, and hiding the numbers or identifying information by replacing the numbers or identifying information with obscuring symbols displayed on the liquid crystal display (LCD).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE PREFERRED EMBODIMENTS

Figure 1:
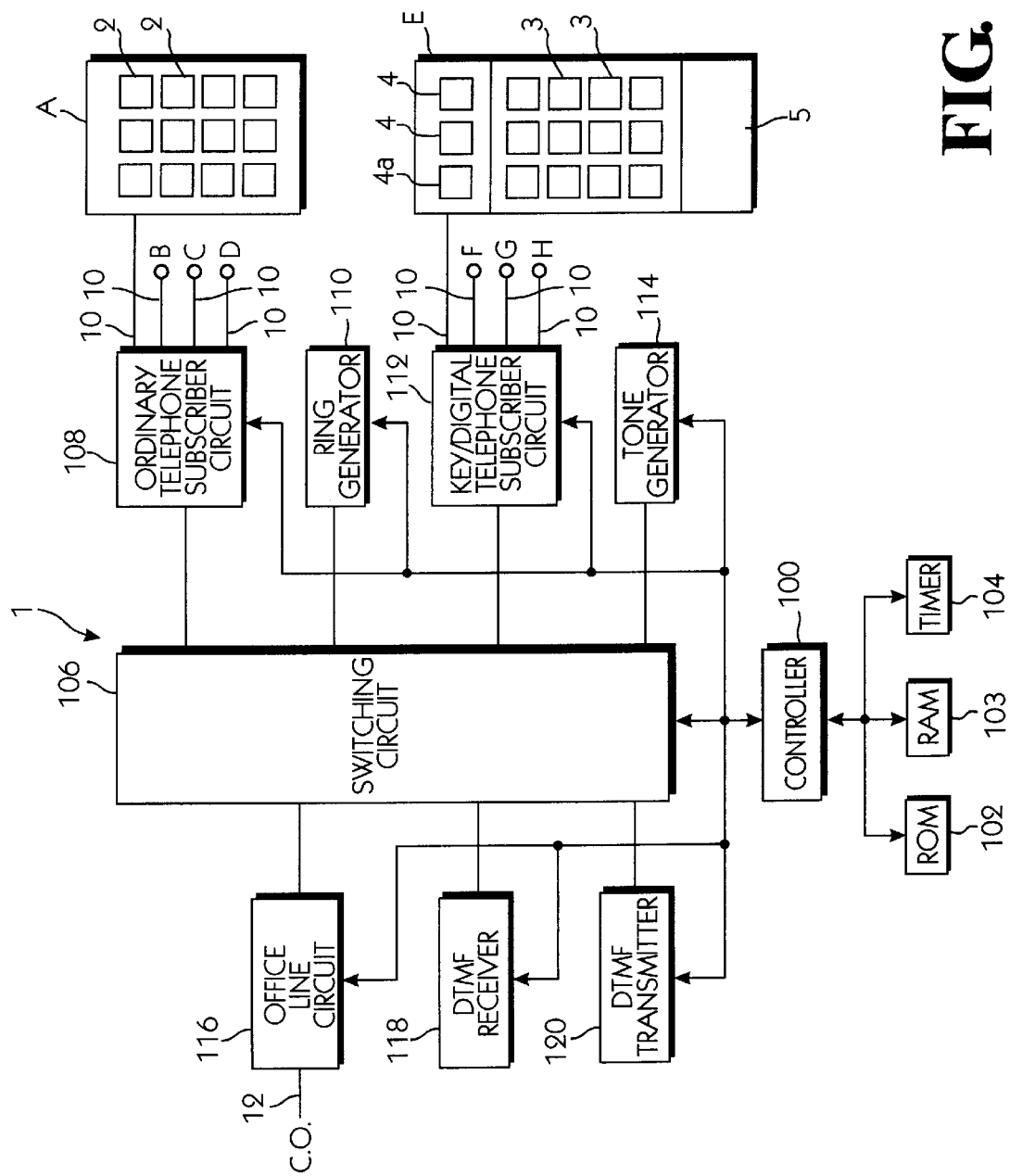
FIG. 1 is a block diagram for illustrating a telephone switching system to which the method of the present invention is applied.

Referring to FIG. 1, the telephone switching system 1 is controlled by a controller 100, of which the control program is stored into a read only memory (ROM) 102, and the processed data temporarily stored into a random access memory (RAM) 103. Namely, the read only memory (ROM) 102 stores the programs and service data, and the random access memory (RAM) 103 temporarily stores the data generated during execution of the programs. A timer 104 generates temporal data applied to the controller 100. A switching circuit 106 serves to switch various tone and sound data under the control of the controller 100.

An ordinary telephone subscriber circuit 108 supplies a current to ordinary telephones A, B, C, D interfacing the switching circuit 106 with the ordinary telephones A, B, C, D. For example, ordinary telephone A is illustrated having a plurality of alpha-numeric, pound (#), and asterisk (*) keys 2 for placing a call. A ring generator 110 generates a ring signal applied to the subscriber line. A key/digital telephone subscriber circuit 112 supplies a current to key/digital telephones E, F, G, H interfacing the switching circuit 106 with the key/digital telephones E, F, G, H. For example, a key digital telephone E is illustrated including a plurality of alpha-numeric, pound (#) and asterisk (*) keys 3 and function keys 4, including a hiding key 4a according to the present invention, as well as a liquid crystal display (LCD) screen 5. The telephones A, B, C, D, E, F, G, H belong to the extension subscribers, which are respectively connected through the subscriber lines 10 with the ordinary telephone subscriber circuit 108 and the key/digital telephone subscriber circuit 112.

A tone generator 114 generates various tone signals applied to the switching circuit 106. An office line circuit 1 16 connects the central office line 12 to interface the central office (C.O.) with the switching circuit 106. A dual tone multi-frequency (DTMF) receiver 118 converts dual tone multi-frequency (DTMF) signals from the switching circuit 106 into digital data transferred to the controller 100. The dual tone multi-frequency (DTMF) signals can be generated by the phone numbers of the external subscribers from the office line or the extension subscribers. A dual tone multi-frequency (DTMF) transmitter 120 converts the digital data from the controller 100 into dual tone multi-frequency (DTMF) signals applied to the switching circuit 106.

Figure 2:
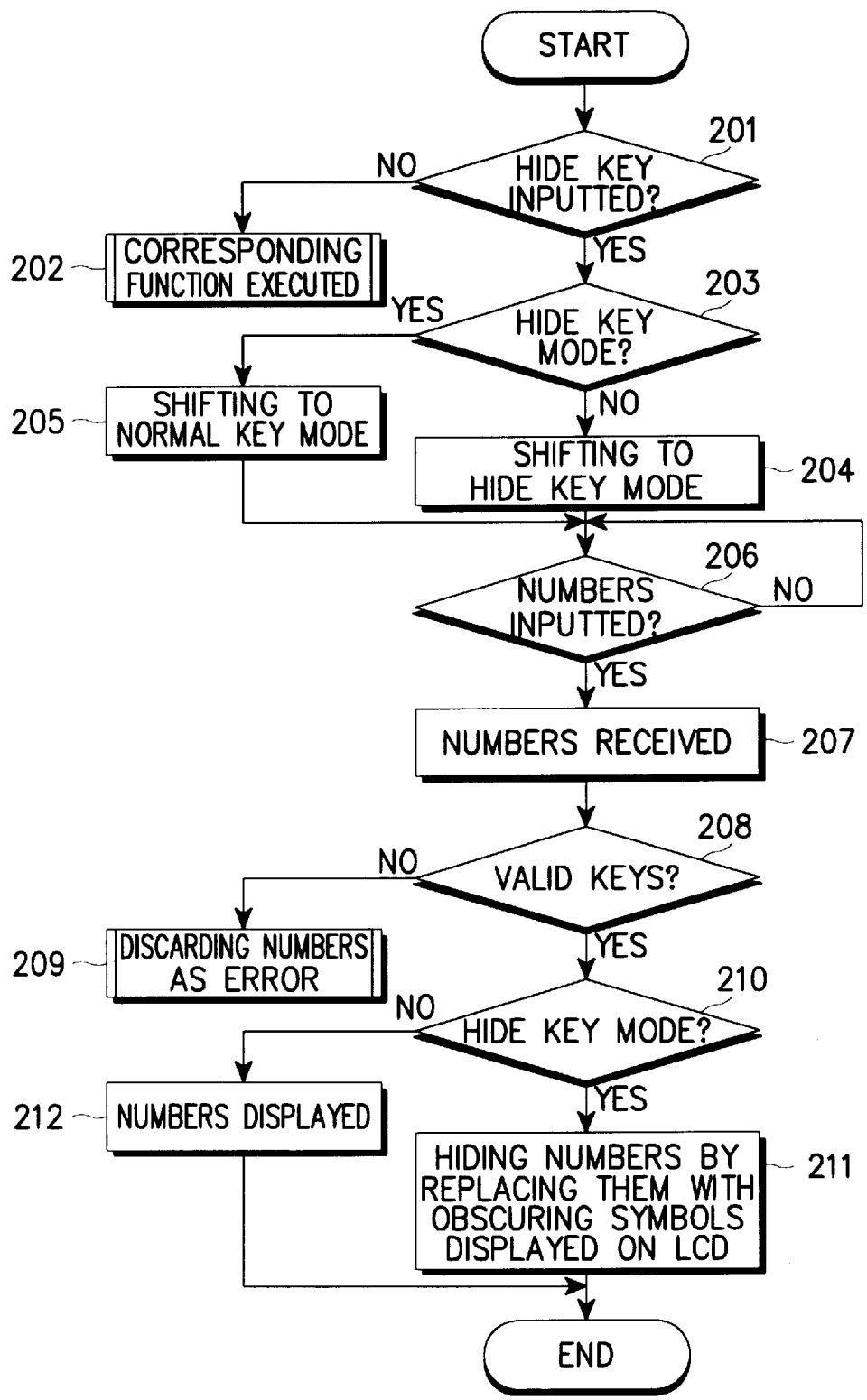
FIG. 2 is a flow chart for illustrating the process of hiding the numbers or identifying information inputted by a user from being displayed on the liquid crystal display (LCD) screen of a telephone according to the present invention.

The controller 100 executes the control program stored in the read only memory (ROM) 102, as shown in the flowchart of FIG. 2, in order to display the numbers or identifying information inputted by the user on the liquid crystal display (LCD) 5 of a key/digital telephone, such as key/digital telephone E, connected with the key/digital telephone subscriber circuit 112. The key/digital telephone, such as key/digital telephone E, includes a hide key 4a to shift the telephone by toggling between the hide key mode and the normal key mode in response to every input of the hide key 4a.

Figure 3:
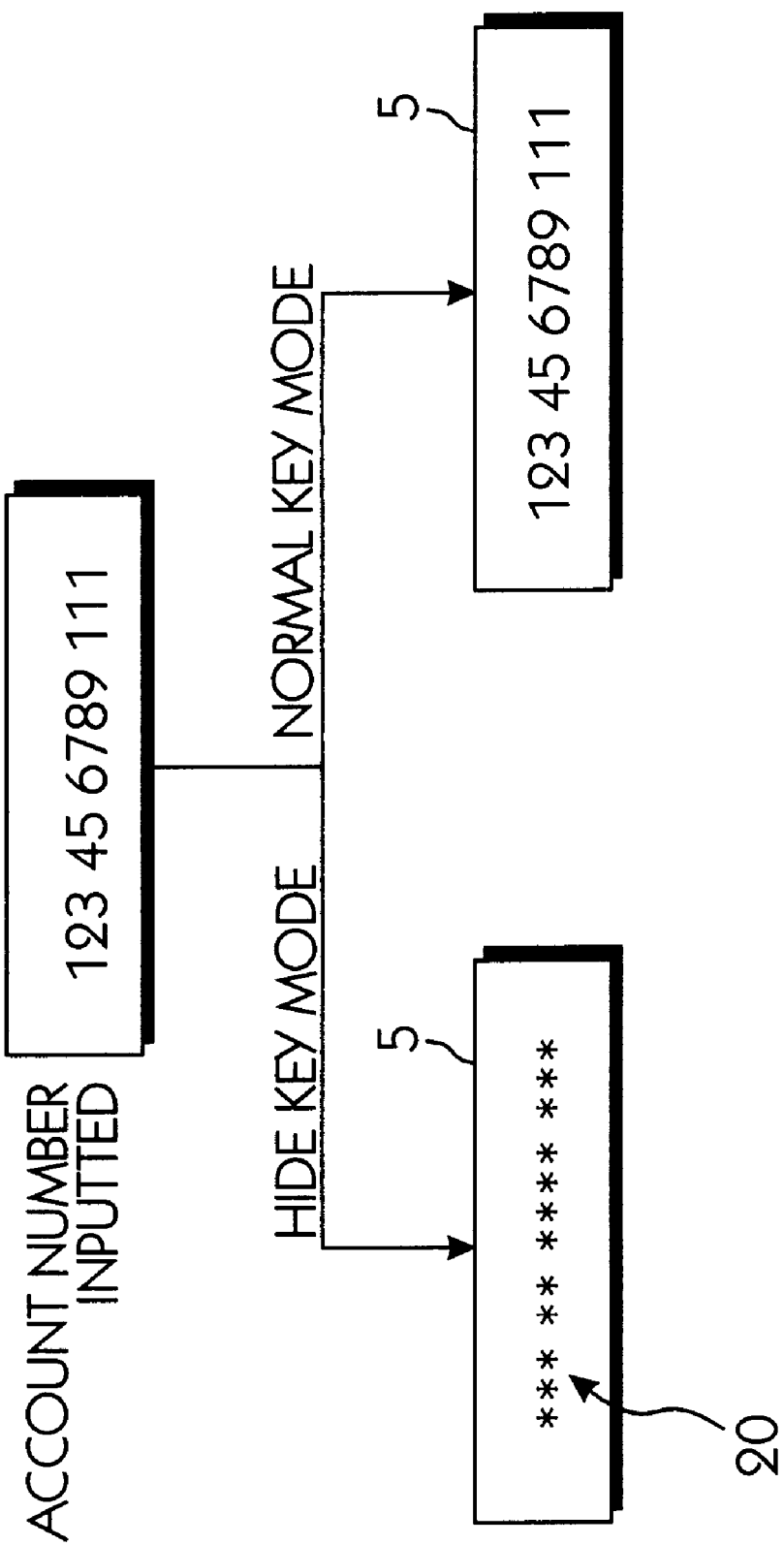
FIG. 3 is a schematic diagram for illustrating the replacement of the numbers or identifying information inputted by a user with obscuring symbols displayed on the liquid crystal display (LCD) screen according to the present invention.

Referring to FIGS. 1 through 3, describing the process of the present invention of hiding the numbers or identifying information inputted by the user to the telephone, such as telephone E, from being displayed on the liquid crystal display (LCD) screen 5 in connection with FIGS. 2 and 3, if the hide key 4a is pressed in step 201, the controller 100 determines in step 203 whether the telephone, such as key/digital telephone E, is set to the key hide mode. Otherwise, if another key is pressed on the key/digital telephone E, the controller 100 executes a corresponding function in step 202. If the telephone has been already set to the hide key mode, the controller 100 shifts the telephone to the normal key mode in step 205. On the contrary, if the telephone has been set to the normal key mode, the controller 100 shifts the telephone, such as telephone E, to the hide key mode in step 204.

Thereafter, in step 206, numbers or identifying information are inputted, such as by keys 3 or 4 of key/digital telephone E, by the user to generate a dual tone multi-frequency (DTMF) signal transferred to the dual tone multi-frequency (DTMF) receiver 118 and, if the numbers or identifying information are not input or received, the process waits at step 206 for input of the numbers or identifying information. Detecting the numbers or identifying information in step 206, the controller 100 receives the detected numbers in step 207, and determines in step 208 whether they correspond with valid keys. If the detected numbers or identifying information do not correspond to valid keys, the controller 100 discards them as error in step 209. However, if they correspond to valid keys, the controller 100 determines step 210 whether the telephone has been set to the hide key mode. If the telephone is in the hide key mode, the controller 100 hides the numbers or identifying information in step 211 by replacing them with obscuring symbols displayed on the liquid crystal display (LCD) 5. In this case, the obscuring symbols 20 can be an asterisk "*", or a plurality of asterisks, for example, as shown in FIG. 3. On the contrary, if the telephone is in the normal key mode, the controller 100 displays the numbers or identifying information on the liquid crystal display (LCD) 5 in step 212. Namely, as shown in FIG. 3, the account number "123 45 6789 111" inputted by the user in phone banking is hidden by replacing it with obscuring symbols 20 of "*  ** *", displayed on the liquid crystal display (LCD) 5 if the telephone is in the hide key mode, or directly displaying the numbers or identifying information on the liquid crystal display (LCD) 5 if the telephone is in the normal key mode. The identifying information input by keys of the telephone, such as telephone E, in addition to being numbers can also symbols or letters, or combinations thereof, input by the keys 3 or 4 of the telephone E, for example.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method of displaying numbers inputted by a user on a liquid crystal display (LCD) screen provided in a telephone connected through an extension with a telephone switching system, comprising the steps of:

setting selectively said telephone to a hide key mode to hide numbers inputted by said user in response to the input by said user of a hide key of said telephone; and inputting said numbers by said user to said telephone; and hiding said numbers inputted by said user by replacing said numbers with obscuring symbols displayed on said liquid crystal display (LCD) screen of said telephone in said hide key mode.

2. The method of claim 1, further comprising the step of determining whether said numbers inputted by said user correspond with valid keys of said telephone.

3. A method of displaying numbers inputted by a user on a liquid crystal display (LCD) screen provided in a telephone connected through an extension with a telephone switching system, comprising the steps of:

shifting selectively said telephone between a hide key mode to hide numbers received from said user and a normal key mode to display the numbers received from said user in response to input of a hide key of said telephone;

receiving said numbers by said telephone;

determining whether said telephone is set to one of said hide key mode and said normal key mode;

hiding said numbers received by replacing said numbers received with obscuring symbols displayed on said liquid crystal display (LCD) of said telephone when said telephone is in said hide key mode; and displaying said numbers received on said liquid crystal display (LCD) screen of said telephone when said telephone is in said normal key mode.

4. The method of claim 3, further comprising the step of determining whether said numbers received correspond with valid keys of said telephone.

5. A method of displaying information inputted by a user on an liquid crystal display (LCD) screen provided in a telephone connected through an extension with a telephone switching system, comprising the steps of:

setting selectively said telephone to a hide key mode to hide information inputted by said user to in response to the input by said user of a hide key of said telephone; and inputting said information by said user to said telephone; and hiding said information inputted by said user by replacing said information with obscuring symbols displayed on said liquid crystal display (LCD) screen of said telephone in said hide key mode.

6. The method of claim 5, further comprising the step of determining whether said information inputted by said user corresponds with valid keys of said telephone.

7. A method of displaying information inputted by a user on a liquid crystal display (LCD) screen provided in a telephone connected through an extension with a telephone switching system, comprising the steps of:

shifting selectively said telephone between a hide key mode to hide information received from said user and a normal key mode to display the information received from said user in response to input of a hide key of said telephone;

receiving said information by said telephone;

determining whether said telephone is set to one of said hide key mode and said normal key mode;

hiding said information received by replacing said information received with obscuring symbols displayed on said liquid crystal display (LCD) of said telephone when said telephone is in said hide key mode; and displaying said information received on said liquid crystal display (LCD) screen of said telephone when said telephone is in said normal key mode.

8. The method of claim 3, further comprising the step of determining whether said information received corresponds with valid keys of said telephone.

9. An apparatus for displaying numbers inputted by a user in a telephone connected through an extension with a telephone switching system, comprising:

means for inputting numbers by a user to said telephone;

a hide key of said telephone for selectively setting said telephone in a hide key mode to hide said numbers input by said user; and means for hiding said numbers input by said user by replacing said numbers with obscuring symbols for display on a liquid crystal display (LCD) screen of said telephone.

10. The apparatus of claim 9, further comprising means for determining whether said numbers inputted by said user correspond with valid keys of said telephone.

11. An apparatus for displaying numbers inputted by a user in a telephone connected through an extension with a telephone switching system, comprising:

means for receiving numbers by said telephone;

a hide key for selectively setting said telephone in a hide key mode to hide said numbers received and a normal key mode for displaying said numbers received; and means for hiding said numbers received by replacing said numbers received with obscuring symbols for display on a liquid crystal display (LCD) of said telephone when said telephone is in said hide key mode, and for selectively displaying said numbers received on said liquid crystal display (LCD) screen of said telephone when said telephone is in said normal key mode.

12. The method of claim 11, further comprising means for determining whether said numbers received correspond with valid keys of said telephone.

13. An apparatus for displaying information inputted by a user in a telephone connected through an extension with a telephone switching system, comprising:

means for inputting information by a user to said telephone;

a hide key of said telephone for selectively setting said telephone in a hide key mode to hide said information input by said user; and means for hiding said information inputted by said user in said hide key mode by replacing said information with obscuring symbols for display on a liquid crystal display (LCD) screen of said telephone.

14. The apparatus of claim 13, further comprising means for determining whether said information inputted by said user corresponds with valid keys of said telephone.

15. An apparatus for displaying information input by a user in a telephone connected through an extension with a telephone switching system, comprising:

means for receiving information by said telephone;

a hide key for selectively setting said telephone in a hide key mode to hide said information received and a normal key mode for displaying said information received; and means for hiding said information received by replacing said information received with obscuring symbols for display on a liquid crystal display (LCD) of said telephone when said telephone is in said hide key mode, and for selectively displaying said information received on said liquid crystal display (LCD) screen of said telephone when said telephone is in said normal key mode.

16. The apparatus of claim 15, further comprising means for determining whether said information received corresponds with valid keys of said telephone.

17. A telephone for use with a telephone switching system, comprising:

a display for said telephone;

a plurality of keys for inputting information by a user to said telephone; and a hide key for selectively setting said telephone in a hide key mode for hiding said information input so as to be displayed with obscuring symbols on said display and for selectively setting said telephone in a normal key mode so as to display said information input on said display.

18. The telephone of claim 17, further comprised of said display comprising a liquid crystal display (LCD) screen.

19. The telephone of claim 18, the further comprised of said information comprising numbers.

20. The telephone of claim 17, further comprised of said information comprising numbers.

* * * * *